UNITED STATES PATENT OFFICE 2,078,545

PROCESS FOR THE PRODUCTION OF HALOGENATION PRODUCTS OF RUBBER AND LIKE SUBSTANCES

Otto Schweitzer, Frankfort-on-the-Main-Hochst, Germany, assignor to Metallgesellschaft Aktiengesellschaft, Frankfort-on-the-Main, Germany, a corporation of Germany No Drawing. Application January 19, 1935, Serial No. 2,603. In Germany January 24, 1934

16 Claims. (Cl. 260—1)

This invention relates to a process for the production of halogenation products of rubber and like substances, and more particularly to the production of halogenation products of rubber by the action of halogens or halogen hydracids on a solution of rubber. With the usual procedure, in which the chlorine is gradually introduced into the rubber solution, disturbances often occur which lead to the formation of worthless or inferior grade products.

It has been ascertained on the basis of experiments, that the aforesaid defects of the known process seem to be attributable to the fact that, in carrying out the said known process, compounds with a medium chlorine content—for example about 25-45%—are formed, which possess a decidedly greater reactivity than the highly-chlorinated products, which latter are characterized by stability. The products with a medium degree of chlorination display, in particular, a tendency to extensive inspissation, in an irreversible manner, or even to assume the condition of gels, thereby becoming useless. With the ordinary procedure, such as passing chlorine into a rubber solution, the conditions for the formation of the unstable medium stages of chlorination are extremely favourable because—apart from the later stages of the reaction, in which the major portion of the rubber is already chlorinated—the chlorine introduced into the solution encounters a larger excess of unchlorinated rubber, under which conditions the low or medium stages of chlorination are primarily formed.

Attempts to overcome the said difficulties by introducing the chlorine as actively as possible, failed to produce satisfactory results because the high reactional energy of the chlorination process imposes limits on the velocity of introduction of the chlorine.

According to the present invention, the rubber solution is introduced into the chlorination apparatus while taking precautions to ensure that the amount of halogenating agent (such as chlorine) present in said apparatus is always adequate to chlorinate the incoming rubber solution quickly to a degree exceeding the medium stages of chlorination which endanger the stability of the solution.

This can be achieved, for example, by allowing the rubber solution under treatment to run slowly into the chlorination apparatus into which the chlorine is admitted, the liquid in the apparatus being kept stirred, for example, by mechanical means. It is preferable that there should be present in the reaction vessel, at the commencement of the reaction, a small amount of solvent saturated with chlorine, or of rubber solution that is saturated with chlorine to an extent beyond the unstable stage of chlorination. It is advisable that the inlet for the rubber solution under treatment should be below the surface of the liquid being, for example, located at the bottom of the vessel. The velocity with which the chlorine gas and rubber solution are admitted is regulated so as to ensure that there is always present in the solution an amount of free chlorine that is sufficient to chlorinate, during its distribution, the incoming rubber solution quickly in excess of the unstable stage.

The process of the present invention has also the advantage that the particles of rubber present in the initial stage of chlorination are highly dispersed and consequently are unable to coalesce to a gel. The process therefore enables working to be carried on with highly concentrated rubber solutions, such as those of 15% strength when chlorbenzene is employed as the solvent. After the termination of the reaction, the solution may, for example, be further worked up to dry chlorinated rubber or—if chlorbenzene has been used as the solvent— be employed directly for the production of chlorinated rubber lacquers, after the removal of the free hydrochloric acid and the chlorine. Operating with chlorbenzene has the special advantage that the chlorination can be performed at higher temperatures. Under these conditions, the present process not only enables chlorinated rubber preparations to be obtained that are stable, both in the dry and dissolved state, but even products having only a comparatively low chlorine content (such as 45-50%) which form stable (i. e. non-gelatinizing) solutions and are valuable on account of their elastic properties.

In order to stabilize the halogenation products produced in accordance with the present invention, and to prevent subsequent gelatinization—which may sometimes set in gradually—it has been found advantageous to treat said solutions with small quantities of polyhydric phenols, such as pyrogallol or resorcinol. Unsaturated oils, such as linseed oil or wood oil, also have an excellent stabilizing effect and, at the same time, afford the advantage of rendering innocuous any residual traces of the halogen hydracids present.

The present process can also be applied, in general, to the chlorination of other substances furnishing unstable intermediate chlorination products, for example, to the chlorination of balata, gutta percha, synthetic types of rubber and the like unsaturated hydrocarbons of high molecular weight and their chlorinable derivatives. In order to obtain products furnishing mobile solutions, the chlorine gas employed for the reaction—or a portion of such chlorine—may be mixed or introduced conjointly with a little oxygen or ozone, or gases (such as air) containing these or other gaseous oxidizing agents. The rubber solution may also be treated with the same gaseous, or other oxidizing agents, such as manganese dioxide, lead peroxide, per-acids or other per-oxides, prior to chlorination.

Chlorine may also be replaced by the other halogens and the halogen hydracids, or by mixtures of halogens and halogen hydracids.

Suitable solvents comprise all such rubber solvents as resist the action of halogens, under the conditions of the reaction, and are capable of dissolving chlorinated rubber as well as rubber itself.

Example I

A reaction apparatus is charged with 25 litres of carbon tetrachloride, and a moderate current of chlorine gas is passed through the solvent. After the solvent has been saturated with chlorine, 500 kgs. of a 5% solution of masticated rubber in carbon tetrachloride is added—the introduction of chlorine gas being continued—in such a way that, although the reaction—which is recognizable by the resulting liberation of gas—continues to proceed satisfactorily, there is at no time present in the solution any more rubber, in an unchlorinated or only slightly chlorinated condition, than can be chlorinated to a degree exceeding the unstable stages, by the chlorine present at any instant. The rubber solution is admitted below the level of the liquid, the latter being kept in motion by a stirrer. After all the rubber solution under treatment is in the introduction of the gaseous chlorine is continued until the chlorinated rubber in the solution has attained the desired degree of chlorination. A portion of the solvent is then distilled off, the bulk of the free hydrochloric acid being removed at the same time. In order to eliminate the final traces of free hydrochloric acid, the still warm solution is treated with lime for several hours. After the lime has settled down, the solution is worked up to dry substance in known manner.

Example II

A reaction apparatus is charged with 25 litres of chlorbenzene, and a moderate current of chlorine is passed through the solvent, the latter being heated to 110° C. After the solvent has been saturated with the chlorine gas, 500 kgs. of a 15% solution of masticated rubber are run in slowly, under the same conditions as set forth in Example I, the introduction of chlorine being continued. The temperature of the solution present in the chlorination apparatus is maintained at 105–115° C. throughout the entire period of the reaction. After the whole of the rubber solution, under treatment, is in, the introduction of chlorine is continued until the chlorinated rubber in the solution has a chlorine content of 50%. A portion of the solvent is then distilled off, together with the free hydrochloric acid. The solution is next treated with 2% of linseed oil (referred to the quantity of the solution) and with 1% of pyrogallol (referred to the amount of dry substance in the chlorinated rubber). After cooling and—if necessary—filtering off any insoluble matter present, the solution can be worked up to lacquers in known manner.

Example III

A moderately strong current of chlorine gas is passed into 25 litres of carbon tetrachloride contained and kept stirred in a reaction apparatus. As soon as saturation with the chlorine is attained, 500 kgs. of a 5% solution of rolled rubber in carbon tetrachloride are added in a thin stream, the admission of chlorine being continued, the entering velocity being so regulated that the reaction—recognizable by the liberation of gas—is actively maintained throughout.

After the first half of the rubber solution under treatment has been admitted, 10% of oxygen is mixed with the entering chlorine gas. The supply of this gaseous mixture is continued until the whole of the rubber solution under treatment has entered the reaction apparatus. From this point onwards, pure chlorine gas is again introduced until the desired degree of chlorination has been reached. A portion of the solvent is then distilled off, together with the bulk of the hydrochloric acid. For the further elimination of free hydrochloric acid, the still warm distillation residue is treated with solid sodium carbonate. After standing for several hours, the solution is separated from the solid sodium carbonate and its solid reaction products, and is sprayed, through nozzles, into warm sodium carbonate solution, of about 4% strength. The chlorinated rubber thrown down in flakes is separated from the solution, washed with water and dried.

I claim:

1. Process for the production of halogenated rubber which comprises gradually introducing halogenating agent and rubber solution into a halogenating mixture at such relative rates that the amount of halogenating agent present in the resulting mixture is always at least sufficient for conversion of all of the rubber content of the mixture beyond the unstable medium stage of halogenation.

2. A process of producing halogenated rubber, which comprises gradually introducing a rubber solution into a rubber solvent containing halogenating agent, and introducing halogenating agent into the mixture, the relative rates of introduction of the rubber solution and halogenating agent being such that the amount of halogenating agent present at any given moment is at least sufficient for conversion of all the entering rubber beyond the unstable medium stage of halogenation.

3. A process of producing halogenated rubber which comprises introducing slowly into a body of rubber solvent saturated with a halogenating agent a rubber solution and a halogenating agent simultaneously at such a rate that the body of liquid always contains an amount of halogenating agent sufficient to halogenate the rubber present beyond the unstable medium stage of halogenation.

4. Process for the production of halogenated rubber, which comprises gradually introducing halogenating agent and rubber solution into a halogenating mixture at such relative rates that the amount of halogenating agent present in the resulting mixture is always at least sufficient for conversion of all of the rubber content of the mixture into halogenated rubber-containing at least 45% of halogen.

5. Process for the production of chlorinated rubber which comprises gradually introducing chlorinating agent and rubber solution into a chlorinating mixture at such relative rates that the amount of chlorinating agent present in the mixture is always at least sufficient for the conversion of all of the rubber content of the mixture beyond the unstable medium stage of chlorination.

6. A process of producing chlorinated rubber which comprises gradually introducing a rubber solution into a rubber solvent saturated with chlorine and introducing chlorine gas into the mixture, the rate of introduction of the rubber solution and the chlorine being such that the amount of chlorine present at a given moment is at least sufficient for conversion of all of the rubber present into chlorinated rubber containing at least 45% chlorine.

7. A process as claimed in claim 5, wherein the rubber solvent used is chlorbenzene and the reaction is performed at a temperature above 100° C.

8. A process as claimed in claim 5, wherein the reaction is carried out in the presence of a polyhydric phenol.

9. A process as claimed in claim 5, wherein the reaction is carried out in the presence of an unsaturated oil.

10. A process as claimed in claim 5, wherein a gaseous oxidizing agent is introduced jointly with the chlorine.

11. A process as claimed in claim 5, wherein oxygen is introduced jointly with the chlorine.

12. A process as claimed in claim 5, wherein air is introduced jointly with the chlorine.

13. A process as claimed in claim 5, wherein the rubber solution is pretreated with an oxidizing agent.

14. A process as claimed in claim 5, wherein the rubber solution is pretreated with oxygen.

15. A process as claimed in claim 5, wherein the rubber solution is pretreated with air.

16. A process as claimed in claim 5, wherein the rubber solution is pretreated with a peroxide.

OTTO SCHWEITZER.